… … …

United States Patent Office 3,502,495
Patented Mar. 24, 1970

3,502,495
PRINTING RESINS WITH PENETRATING INK
Akiyuki Akamatsu, Yokohama, Japan, assignor to Toyo Kako Co., Ltd., Tokyo, Japan, a corporation of Japan
No Drawing. Continuation-in-part of application Ser. No. 332,025, Dec. 20, 1963. This application Nov. 6, 1967, Ser. No. 680,971
Claims priority, application Japan, Dec. 28, 1962, 37/59,348
Int. Cl. B41m 1/30; B44d 1/24; C09d 11/06
U.S. Cl. 117—38
10 Claims

ABSTRACT OF THE DISCLOSURE

A process for printing on a thermoplastic resin article and an article printed by this process. Said process comprises heating a thermoplastic resin article and a special ink at a temperature 1° to 50° C. lower than the softening point of the thermoplastic resin article, cooling said article and removing the ink remaining on the printed surface with a suitable solvent, said ink consisting of (1) a colorant which is permeable to said article, (2) a liquid medium which can wet or swell the thermoplastic resin and is a non-volatile or slowly volatile liquid or solid which becomes liquid on heating and (3) adjuvants which cannot be fixed to the resin, cooling said article and removing the ink remaining on the printed surface with a suitable solvent. Since said colorant penetrates into the resin, the printed article obtained by said process is as a "tattoo."

---

This application is continuation-in-part of my application Ser. No. 332,025 filed on Dec. 20, 1963, and now abandoned.

This invention relates to a process for printing on thermoplastic resin articles and printed articles obtained by this process. More particularly, the present invention concerns a process for printing on a shaped thermoplastic resin article, which permit the colorant in the ink applied to the surface of the article to penetrate into the resin article itself to accomplish internal coloring, resulting in the effective printing that is highly enduring. The thermoplastic resin article printed by said method has no ink film on the printed surface but the colorant of the ink penetrates the article as in the case of a "tattoo."

According to the present invention, even polyolefin and polyacetal resin articles can enduringly be printed.

In general, a conventional method of printing upon a thermoplastic resin article is carried out by bonding colorant-incorporated ink films onto the surface of the article. However, in the case of polyolefins and polyacetals, which have high chemical resistance, the bond of the ink film to the resin is so weak that a complete print is difficult to provide. Further, the conventional printing is easily rubbed off by the application of sand-paper and easily wiped off by means of organic solvents. Furthermore, since the conventional printing consists in bonding ink films onto the smooth surface of an article, the printed portion is rough to touch, and its gloss is different from that of the resin article itself.

An object of the present invention is to provide a process for printing on a thermoplastic resin article, in which the colorant in the ink penetrates into the body of the resin articles to accomplish internal coloring for effective printing that is as indelible as "tattoo."

Another object of the present invention is to provide a process for printing on a thermoplastic resin article, whereby an ink film is not left on the printed surface but the article itself is colored as in the case of a "tattoo."

A further object of the present invention is to provide a process for printing on a thermoplastic resin article, which affords durable color printing on the surface of the resin, particularly polyolefins and polyacetals.

Still another object of the invention is to provide a process for printing a thermoplastic resin article with an ink to obtain printing which does not rub off, even by the application of sand-paper, and cannot be removed with any organic solvent.

A still further object of the invention is to provide a process for printing on a thermoplastic resin article which results in an absolutely flat surface and produces uniform surface gloss on both the printed or unprinted surfaces of the article.

Another object of the invention is to provide a thermoplastic resin article with prints on the surface, the said prints resulting from not the bond of ink films onto the surface of the article but the penetration of the colorant in the ink into the resin as in the case of a "tattoo."

According to the present invention, a process for printing on a shaped thermoplastic resin article comprises (1) printing the resin article with an ink comprising (a) a colorant which exhibits a penetrating property, (b) a liquid medium which can wet and/or swell the thermoplastic resin to facilitate the penetration of the colorant thereinto (c) adjuvants which can prevent the ink from flowing and can impart a drying property to the ink, but are not fixed to the resin, (2) heating the printed thermoplastic resin article to permit the penetration of the colorant into the body of said article, (3) cooling said article and (4) removing the residual ink on the surface of said article with water or any other appropriate solvent, so that only the print formed by the penetration of the colorant remains. In that case, if it is necesary to use a reactive dye as the colorant of the ink, a shaped thermoplastic resin article must be swollen on the printed surface with the solvent which contains metal salts in order to react with the reactive dye, and this step may be applied before or after the printing.

Accordng to the present invention, the printing is achieved by the penetration of a colorant into the body of a thermoplastic resin article. Therefore, an ink film is not bonded to the surface of the resin article, but the resin article itself is colored, as indelibly as a "tattoo," so that a print highly resistant to abrasion and to solvents is obtainable.

The ink to be used in the present invention comprises less than 50% of a colorant, 1–50% of a liquid medium and the balance, adjuvants. The adjuvants may comprise 20% to 80% of a film-forming substance and, in some cases, 2 to 20% of a removing agent and others.

The colorants to be used in the process of the present invention should be those capable of penetrating into thermoplastic resins. Since thermoplastic resins are agglomerated masses of hydrocarbons, colorants soluble in hydrocarbons are also soluble in thermoplastic resins and, on heating, penetrate into the body of the resin article, so the colorant must be soluble in hydrocarbons (e.g. benzene), but not soluble in water. In the classification of dyes, they are solvent dyes and dispersed dyes, and they cannot have HSO$_3$-group in their molecules because the dye used in the present invention must be soluble in hydrocarbons, however, dyes having HSO$_3$-group are not soluble in hydrocarbons. In this case, if the thermoplastic resin is polyolefin, it may be better to use a reactive dye which has active OH-group in the molecule, and it reacts with some metal-salts when they exist on or in the resin to form a stable color. Examples of the dyes are shown in Table I.

TABLE I.—USABLE DYES

| Produced by | Name of dye | Color Index No. |
|---|---|---|
| E.I. du Pont de Nemours & Co. | Du Pont Oil: | |
| | Yellow BN | C.I. Solvent Yellow 56. |
| | Blue A | C.I. Solvent Blue 36. |
| | Latyl: | |
| | Yellow YLN | C.I. Disperse Yellow 42. |
| | Yellow 5R | C.I. Disperse Yellow 7. |
| | Yellow 3G | C.I. Disperse Yellow 54. |
| | Red MG | C.I. Disperse Red 65. |
| | Violet RR | C.I. Disperse Violet 18. |
| | Violet BN | C.I. Disperse Violet 72. |
| | Blue FLW | C.I. Disperse Blue 27. |
| | Blue IS | C.I. Disperse Blue 62. |
| | Brill. Blue BG | C.I. Disperse Blue 60. |
| | Acetamine: | |
| | Yellow CG | C.I. Disperse Yellow 3. |
| | Yellow N | C.I. Disperse Yellow 32. |
| | Orange GR | C.I. Disperse Orange 3. |
| | Red RP | C.I. Disperse Red 65. |
| | Red BE | C.I. Disperse Red 17. |
| | Rubin B | C.I. Disperse Red 13. |
| | Celanthrene: | |
| | Fast Red Y | C.I. Disperse Red 4. |
| | Red 3BN | C.I. Disperse Red 15. |
| | Rubine 3B | C.I. Disperse Red 5. |
| | Red Violet R | C.I. Disperse Violet 1. |
| | Violet CB | C.I. Disperse Violet 4. |
| | Brill. Blue FFS | C.I. Disperse Blue 3. |
| Mitsubishi Chemical Co. | Diacelliton: | |
| | Fast Yellow GL | C.I. Disperse Yellow 33. |
| | Fast Orange R | C.I. Disperse Orange 1. |
| | Scarlet B | C.I. Disperse Red 1. |
| | Fast Scarlet RF | C.I. Disperse Red 7. |
| | Fast Blue FFBF | C.I. Disperse Blue 5. |
| | Fast Blue Green BF | C.I. Disperse Blue 7. |
| | Fast Blue BF | C.I. Disperse Blue 14. |
| | Fast Black DF | C.I. Disperse Black 1. |
| Mitsui Chemical Co. | Miketon: | |
| | Fast Yellow 7G | C.I. Disperse Yellow 31. |
| | Fast Brown 3R | C.I. Disperse Orange 5. |
| | Fast Blue B | C.I. Disperse Blue 1. |
| Sumitomo Chemical Co. | Sumikaron: | |
| | Yellow 5G | C.I. Disperse Yellow 5. |
| | Orange B | C.I. Disperse Orange 13. |
| | Red 3B | C.I. Disperse Red 11. |
| | Violet RR | C.I. Disperse Violet 18. |
| | Blue BR | C.I. Disperse Blue 26. |
| Ikeda Chemical Co. | Iketon: | |
| | Orange extra | C.I. Solvent Yellow 14. |
| | Red B extra | C.I. Solvent Red 24. |
| | Red G | C.I. Solvent Orange 7. |
| | Blue extra | C.I. Solvent Blue 11. |
| | Brown extra | C.I. Solvent Brown 5. |
| Sumitomo Chemical Co. | Sumiplene: | |
| | Yellow M-G | |
| | Yellow M-3G | |
| | Yellow M-GR | |
| | Orange M-G | |
| | Orange M-R | |
| | Red M-G | |
| | Red M-3B | |
| | Scarlet M-G | Reactive dye. |
| | Violet M-B | |
| | Violet M-RR | |
| | Blue M-G | |
| | Blue M-3R | |
| | Navy Blue M-G | |
| | Green M-G | |
| | Green M-B | |
| | Brown M-R | |
| Hodogaya Chemical Co. | Aizen polyplon: | |
| | Yellow GL | |
| | Yellow FGRL | |
| | Yellow GRL | |
| | Yellow FGL | |
| | Orange GL | |
| | Red BL | |
| | Red 3BL | |
| | Red FRL | |
| | Scarlet RL | |
| | Violet RL | |
| | Blue FGL | Reactive dye. |
| | Blue 2GL | |
| | Blue GCL | |
| | Blue FBRL | |
| | Blue 3RL | |
| | Blue FBL | |
| | Blue Black BL | |
| | Green BL | |
| | Green F3BL | |
| | Brown TL | |
| | Brown BL | |

TABLE I.—Continued

| Produced by | Name of dye | Color Index No. |
|---|---|---|
| Mitsubishi Chemical Co. | Daipolon:<br>Yellow GS<br>Yellow 5RS<br>Orange RS<br>Scarlet 3GS<br>Brilliant Scarlet GS<br>Brilliant Red GS<br>Red RS<br>Red BS<br>Red 2BS<br>Brodeaux BS<br>Violet RS<br>Violet BS<br>Dark Green BS<br>Brilliant 5GS<br>Blue RS<br>Navy Blue RS<br>Navy Blue 2BS<br>Black BS | } Reactive dye. |

The amount of the colorant penetrated is proportional to the solubility thereof in benzene, but in the case of the same dye, the degree of penetration is dependent upon the heating temperature and time. The higher the heating temperature and the longer the heating time, the more the colorant penetrates into the body of resin article to result in a deeper color. In case the temperature and time are definite, the deepness of the resulting color is dependent upon the concentration of a colorant solution in contact with the resin article. This relationship is as follows: At 180° C., Oil Blue dye (manufactured by Du Pont de Nemours & Co.) penetrates into polypropylene to a depth of 0.5 mm. in 2 minutes, and to 1.3 mm. in 16 minutes, whereas, at 160° C., to 0.7 mm. in 6 minutes and to 1.1 mm. in 10 minutes, and at 120° C., to 0.4 mm. in 20 minutes. However, even when a colorant has penetrated to a depth of more than 0.5 mm., the resulting color does not become particularly deep. An excess penetration is therefore useless. In addition, the deeper the penetration, the dimmer becomes the contour of the resulting print. Generally, a depth ranging from 0.05 mm. to 1.0 mm. is preferred. Since the printing process of the present invention is achieved by the penetration of a colorant, the application of the present process to a transparent thermoplastic resin article results in a transparent print. Further, in case a thin resin film of 0.01-0.02 mm. in thickness is treated in accordance with the present process, only a light color print is obtained. The resulting print, however, has high fastness and cannot be washed off with a solvent (e.g. benzene).

On the other hand, if the reactive dye is used as the colorant of the ink, it reacts with the metal salts present on or in the resin so that it displays the color, and the tone of the color and its stability against sunshine is better than before reaction. Since the reacted colorant does not penetrate into the resin, the printed surface of the resin should be treated with the solvent which contains metal salts, before or after printing. As the solvent swells the resin, such metal salts penetrate into the resin and are reacted with the reactive dye. Into the ink to be used in the present invention, less than 50% of a colorant is incorporated. The content of the colorant may be controlled depending upon the deepness of a desired color, but the addition of more than 50% of colorant is useless, since the amount of a colorant that can penetrate the article is limited.

Since colorants are, in general, in the form of powders, and in this case, they do not have an affinity to the surface of the thermoplastic resin articles, it is important that they are dissolved in some liquid media and then the resulting solution is brought into contact with the resin article. For this purpose, a liquid medium is used in the present invention.

The liquid medium to be used in accordance with the present invention is one which can be rendered liquid by heating, and can wet or swell the surface of a thermoplastic resin article to facilitate the penetration of colorant. However, any organic solvent which excessively dissolves thermoplastic resins are not usable as the liquid media, since the use thereof results in prints deprived of lustre. Even in the case of the organic solvents which can wet or swell but not dissolve thermoplastic resin, those which are volatile are, in general, not usable as the liquid media of the present invention, because they volatilize too easily to permit time for the penetration of colorants. In contrast therewith, among non-volatile or slow-volatile compounds, there are those which can wet or swell thermoplastic resins, only when they are heated. Some of those compounds are solid at normal temperature but become fluid at elevated temperature to wet or swell resins, and the penetration of colorants is promoted by the liquid pressure occurring in the wetting.

The flowability of the liquid medium is not desirable when the medium is to be incorporated into a printing ink, because the resulting print flows with the use of such liquid medium. Further, the non-volatile or slow-volatile property of the liquid medium disturbs the drying of the ink. In this connection, a substance forming a protective film may be added to the ink to facilitate the drying thereof and to prevent it from flowing.

The film-forming substance itself has no penetrating property and rather inhibits the penetration of colorant. An ink has no drying property, when it has been prepared from a colorant and a liquid medium. Therefore, when an ink is required to have a drying property, a film-forming substance must be incorporated thereinto, and the liquid medium should be added in an amount not more than 50%. Ordinarily, therefore, the liquid medium is added in an amount of 1-50%. In this case, when the amount of the liquid medium is less than the above range, no effect of the liquid medium is noticeable, whereas, in case the amount is more than said range, the resulting ink is deprived of its drying property. On the other hand, the film-forming substance should be used in an amount of at least 20% in order to attain a sufficiently protective property. When incorporated in excess, the film-forming substance absorbs the colorant and the liquid medium to disturb the penetration of the colorant. Therefore, the amount of film-forming substance to be incorporated should be not more than 80%. By the incorporation of the film-forming substance, the flow of the resulting print is prevented, and the surface thereof is dried. The protective film-forming substance neither penetrates into the body of thermoplastic resin article, nor firmly adheres, even when heated, to the surface thereof. Therefore, after the penetration of colorant and the completion of printing, the film of the substance may be removed by means of a proper solvent. Suitable film-forming substances are varnishes employed in ordinary printing.

The liquid medium to be employed in the present invention includes mineral oils, such as petroleum jelly, lubricant oil, grease, liquid paraffin and paraffin wax; animal and vegetable oils and fats, such as whale oil, fish oil, beef tallow, lard, soybean oil and rice oil; plasticizers, such as dibutyl phthalate, di-(2-ethylhexyl) phthalate, butyl benzyl phthalate and tricresyl phosphate; higher fatty acids, such as oleic, lauric, malic, stearic and palmitic acids; and slowly volatile solvents, such as dimethyl formamide, isophorone furfuryl alcohol nitropropane, ethylene glycol monomethyl ether.

The protective film- forming substance is one which forms a film after the vaporization of solvent and which is not welded, even when heated, to synthetic resin articles. Suitable film-forming substances are, in general, printing ink varnishes of nitrocellulose, ethylcellulose, acetyl cellulose, benzyl cellulose, phenolic resins and vinylic resins.

In the process of the present invention, the ink film is removed with a suitable solvent after the colorant has penetrated into the article. In this case, it is very inconvenient to use a solvent, and hence a removing agent which may be soluble in water is often added when the ink used can be removed by washing with water. Ordinarily, the removing agent is added in an amount of 2–20%. In case the amount is less than the above range, no effect of the removing agent is exhibited, whereas, in case the amount is more than said range, the resulting ink is deprived of its printing property. The removing agent to be employed in the present invention includes polyhydric alcohols, such as glycol, glycerin, diglycol, polyvinyl alcohol, methyl cellulose and carboxymethyl cellulose; soaps, such as sodium oleate and sodium stearate; turkey-red oil; polyethylene-lauric ether and polyethyleneglycol.

In the printing process of the present invention, a thermoplastic resin article is printed with the ink and then heated to pentrate the ink into the body of the thermoplastic resin article, and, after cooling, the residual ink on the printed surface is removed with suitable solvents to leave only the colorant-penetrated print, as in the case of a "tattoo."

In this case, the heating may be effected by use of any heat source, such as an electric furnace, infrared heating furnace or the like, and, when the heating is required to be effected below 100° C., steam or hot water may be employed as well. Further, the heating may be effected either before or after printing upon a shaped thermoplastic resin article. In some cases, a heated ink may be applied to a thermoplastic resin article. In either case, the ink penetrates into the body of resin article. This is of great advantage for the following reason: Since a thermoplastic resin is first heated to melt and then shaped into an article, if the ink is applied to the thermoplastic resin while still hot after shaping and before the completion of cooling, the ink penetrates into the shaped resin article without further heating and consequently, a specific heating step may be omitted.

The higher the heating temperature, the more easily the penetration of colorant proceeds. Generally, however, the heating is effected at a temperature 1°–50° C. lower than the softening point of the thermoplastic resin employed. For example, it is at 80°–120° C. for polyethylene, 120°–160° C. of polypropylene, 120°–180° C. for polyacetyl, 50°–80° C. for polystyrene, polyvinylchloride and methyl methacrylate, and 130°–150° C. for polymide.

After the penetration of colorant into the body of the thermoplastic resin article by heating, the remainder of the ink is still bonded to the printed surface. In the process of the present invention, this residual ink must be removed with a suitable solvent. In this case, the removal must be executed when it is cooled; if it has been effected while the article is still hot, the resin article may be colored with the removing solvent which contains the dissolved colorant of the ink.

The process of the present invention can be utilized according to any printing modes, such as screen printing, relief printing, lithographic printing, intagilo printing, etc. In some cases, it is also possible to apply the ink with a writing brush.

Further, the present printing process is applicable to all thermoplastic synthetic resins, such as polyolefins, polyamides, polyvinyl chlorides, polyacetals, polystyrenes, polymethylmethacrylates and polycarbonates, and this process is also applicable to cellulose plastics such as cellulose acetate plastics, cellulose acetate butyrate plastics and cellulose propionate plastics. However, it is better to vary the liquid medium depending upon the kind of resin employed. Further, the penetration of colorant is easy in the case of polyolefins, which are soft, and is difficult in the case of polymethylmethacrylates, which are rigid. If the surface of the resin is rigid, it is better to swell it with a suitable liquid medium. On the other hand, if the thermoplastic resin is a polyolefin, it may be better to use a reactive dye as the colorant of the ink, for its stability against sunshine is higher than other dyes. In this case, the thermoplastic resin article must be swollen with the organic solvent which contains metal salts on the printed surface before or after the printing. Organic solvents which the resin are, for example, benzene, toluene, xylene, methyl benzene, ethyl benzene, styrene, chlorobenzene dichlorobenzene, tetrahydronaphthalene, decahydronaphthalene. Metal salts are fatty acid salts of metals, such as Ni, Zn, Al, Pb, Cu, Co, Cr, and Sn. The fatty acid is such as acetic propionic butyric, stearic and oleic acid.

In the printed thermoplastics resin articles of the present invention, an ink film is not bonded to the printed surface of the articles but the article is internally colored as in a "tattoo." Therefore, the present print is far superior to any other conventional printing in terms of resistance to peeling, abrasion or chemical corrosion. Particularly, in polyolefin and polyacetal resin articles, the ink usually penetrates more than 0.1 mm., so that this print is completely resistant to sandpapering though obviously succumbs to the violent scraping with a knife. Further, this type of resin is insoluble in ordinary solvents, so the print on this type of resin shows no high resistance to organic solvents that the printed surface has not been affected at all even after 48 hours immersion in ethyl alcohol, gasoline or benzene, as evinced in our tests. The printed surface of the article is flat, and the gloss on the printed surface is also uniform throughout the unprinted and printed surfaces of articles. More important, the article is internally colored, and hence this printing stands against bending and extending, though the printing is obviously bent or extended when the plastic is subjected to such operation.

The following examples illustrate the embodiments of the present invention, but it should not be construed that the scope of the present invention be limited thereto.

EXAMPLE 1

A shaped polyethylene articles was printed in the following manner: 10 g. of Acetamine Red BE was mixed with 5 g. of grease and 35 g. of nitrocellulose type printing varnish to form an ink. The shaped polyethylene article was printed with the thus prepared ink and then heated in an electric furnace at 100° C. for 5 minutes, whereby the colorant penetrated into the polyethylene article to a depth of about 0.5 mm. After cooling the article, the ink remaining on the surface of the article was washed off with benzene to leave a colorant-penetrated print.

EXAMPLE 2

A polypropylene sheet was printed in the following manner: 5 g. of Du Pont Celanthren Violet R was mixed with 3 g. of petroleum jelly, 20 g. of phenolic resin type printing varnish and 3 g. of turkey-red oil to form an ink. The polypropylene sheet was printed with the ink thus prepared and then passed under an infrared lamp for 2–3 minutes. The colorant penetrated into the polypropylene sheet to a depth of about 0.3 mm., and the ink remaining on the surface of the sheet was washed off with water. (The phenolic resin varnish was prepared by thoroughly mixing 75 parts of 100% phenolic resin or resin-modified phenolic resin with 25 parts of a drying oil, cooling the mixture at 260°–290° C. until the mixture became transparent, and adding to the mixture a petroleum solvent so that the mixture came to have a suitable viscosity.)

EXAMPLE 3

A polyethylene article shaped by vacuum forming was printed in the following manner:

Polyethylene was softened by heating and subjected to vacuum forming. Immediately thereafter and before the resulting shaped polyethylene article was subjected to cooling, i.e. while the polyethylene article was still hot and at a temperature of about 110° C., the article was printed with an ink. The ink was prepared by dissolving 5 g. of Du Pont Oil Yellow NB together with 3 g. of paraffin wax and 5 g. of sodium oleate in 30 g. of a 10% solution of ethylcellulose in toluene. The colorant immediately penetrated into the article and the printing was completed when the article had been cooled. The ink remaining on the surface of the printed article was removed after the completion of the shaped article.

EXAMPLE 4

A shaped polyacetal product was printed in the following manner:

A shaped polyacetal article was printed with an ink prepared by mixing 3 g. of Du Pont Letyl Violet RR with 3 g. of oleic acid, 20 g. of vinyl resin varnish and 5 g. of polyethylene lauric ether, and then heated at 160° C., for 10 minutes. After cooling, the ink left on the surface of said article was wiped off with water. (The vinyl resin varnish comprises 30 parts of a low polymerization degree vinyl chloride resin, 3 parts of a plasticizer, 45 parts of cyclohexanone, 22 parts of mesityl oxide and 10 parts of xylene.)

EXAMPLE 5

A rigid vinyl chloride product was printed in the following manner:

3 g. of Du Pont Celanthrene Brill. Blue FFS, 2 g. of di-(2-ethylhexyl)phthalate, 3 g. of isophorone, 5 g. of polyethylene glycol was mixed with 20 g. of a phenolic resin varnish to form an ink. The rigid vinyl chloride product was printed with the ink and then heated at 60° C. for 20 minutes. The colorant penetrated into the resin and the ink film on the surface of the product was wiped off.

EXAMPLE 6

A shaped polystyrene article was printed in the following manner:

3 g. of Du Pont Oil Blue A was mixed with 10 g. of ethylene glycol monomethyl ether, 5 g. of polyethylene glycol and 20 g. of a vinyl resin varnish to form an ink. The shaped polystyrene article was printed with the ink thus obtained and then heated at 60° C. for 20 minutes. After cooling the printed article, the ink remaining on the surface of the article was wiped off with ethanol or water.

EXAMPLE 7

Shaped polymethyl methacrylate article was printed in the following manner:

3 g. of Du Pont Oil Blue A was mixed with 10 g. of furfuryl alcohol, 5 g. of glycol and 20 g. of a 20% solution of ethyl cellulose in ethanol to form an ink. The shaped polymethyl methacrylate article was printed with the ink thus obtained and then heated at 70° C. for 20 minutes. After cooling the printed article, the ink remaining on the surface of the article was wiped off with water.

EXAMPLE 8

A polyethylene sheet was offset-printed in the following manner:

The same ink as in Example 2 was heated to 110°–120° C. and the heated ink was applied to the sheet, whereby the colorant penetrated into the sheet to a depth of 0.3 mm. before the ink was cooled. The ink remaining on the surface was washed off with water.

EXAMPLE 9

A polyethylene sheet was printed in the following manner:

The polyethylene sheet was treated with a xylene solution which contains 10% of nickel acetate, at 80° C. for 3 minutes, and after dried, it was printed as follows: 3 g. of Aizen Polyplon Red 3BL dye was mixed with 3 g. of grease and 50 g. of ethyl cellulose type printing varnish to prepare an ink. The polyethylene sheet which had been treated with xylene was printed with the ink thus prepared and then heated in an electric furnace at 95° C. for 5 minutes, whereby the colorant penetrated into the polyethylene sheet and reacted with nickel acetate to present a stable color. After cooling, the ink remaining on the surface of the sheet was washed off with benzene.

EXAMPLE 10

A polyethylene film was printed in the following manner:

5 g. of Diapolon Blue RS dye was mixed with 10 g. of petroleum jelly, 10 g. of ethyl cellulose and 60 g. of toluene to prepare an ink. The polyethylene film was printed with the ink thus prepared and then heated at 90° C. for 3 minutes. After cooling the ink left on the surface of said film was wiped off with toluene, and then passed through a dichlorbenzene bath containing 10% of zinc stearate at 95° C. for 2 minutes.

What is claimed is:

1. A process for printing on an article of a resin selected from the group consisting of polyethylene, polypropylene, polyacetal, polyvinyl chloride, polystyrene, polymethyl methacrylate, polyamide, polycarbonate, cellulose acetate, cellulose buytrate, and cellulose propionate, which comprises applying a special ink to the surface of the resin article; heating at least one of the ink and the resin article at a temperature of 1° to 50° C. lower than the softening point of the resin to transfer the dye contained in the ink to the surface of the article and allow the dye to penetrate the resin article, thereby accomplishing internal coloring; cooling said article; and then removing the ink which remains on the applied surface with a suitable solvent, said ink containing less than 50% of a hydrocarbon-soluble solvent dye of a disperse dye, 1 to 50% of a liquid medium selected from the group consisting of petroleum jelly, lubricant oil, grease, liquid paraffin, paraffin wax, whale oil, fish oil, beef tallow, lard, soybean oil, rice oil, oleic acid, lauric acid, maleic acid, stearic acid, palmitic acid, isophorone, dimethylformamide, dibutyl phthalate, di(2-ethylhexyl) phthalate, butyl benzyl phthalate, tricresyl phosphate, ethylene glycol monomethyl ether, nitropropane and furfuryl alcohol, and 20 to 80% of a printing ink varnish selected from the group consisting of nitrocellulose, ethylcellulose, acetylcellulose, benzylcellulose, rosin-modified phenol resin and a low polymerization degree vinyl chloride resin.

2. A process according to claim 1, wherein the resin is a polyacetal resin and the liquid medium is oleic, lauric, maleic, stearic or palmitic acid.

3. A process according to claim 1, wherein the resin is a polyacetal resin and the liquid medium is oleic, isophorone, dimethylformamide, dibutyl phthalate, di-(2-ethylhexyl) phthalate, butyl benzyl phthalate or tricresyl phosphate.

4. A process according to claim 1, wherein the resin is a polystyrene resin and the liquid medium is ethylene glycol monomethyl ether or nitropropane.

5. A process according to claim 1, wherein the resin is a polymethyl methacrylate resin and the liquid medium is furfuryl alcohol.

6. A process according to claim 1, wherein the printing ink further contains 2 to 20% of a removing agent selected from the group consisting of glycol, glycerine, diglycol, polyvinyl alcohol, methyl cellulose, carboxymethyl cellulose, turkey-red oil, polyethylene-lauric ether, polyethylene glycol, sodium oleate and sodium stearate.

7. A printed article produced by the process of claim 1.

8. A process for printing on an article of a resin selected from the group consisting of polyethylene and polypropylene, which comprises treating the resin article with an organic solvent containing at least one metal salt of an acid selected from the group consisting of acetic, propinic, butyric, stearic and oleic acids, the metal of said salt being selected from the group consisting of Ni, Zn, Al, Pb, Sn, Cu, Co, and Cr; applying, after or before said treatment, an ink containing a reactive dye having an active —OH group in the molecule to the surface of said resin article; heating at least one of the ink and the resin article at a temperature 1° to 50° C. lower than the softening point of the resin to penetrate the reactive dye contained in the ink into the resin article and allow it to react with the metal salt, thereby forming a stable color; cooling said article; and then removing the ink which remains on the applied surface with a suitable solvent.

9. A process according to claim 8, wherein the printing ink further contains 2 to 20% of a removing agent selected from the group consisting of glycol, glycerine, diglycol, polyvinyl alcohol, methyl cellulose, carboxymethyl cellulose, turkey-red oil, polyethylene-lauric ether, polyethylene glycol, sodium oleate and sodium stearate.

10. A printed article produced by the process of claim 8.

References Cited

UNITED STATES PATENTS

| | | | |
|---|---|---|---|
| 2,640,782 | 6/1953 | Bloch et al. | 106—28 |
| 2,915,416 | 12/1959 | West | 106—32 X |

OTHER REFERENCES

Ellis, C.: "Printing Inks" Reinhold Publishing, N.Y., 1940, pp. 204–206, 114–115.

Larsen, L.M.: "Industrial Printing Inks" Reinhold Publishing Co., N.Y., 1962, pp. 128–129, 100.

ALFRED L. LEAVITT, Primary Examiner

ALAN GRIMALDI, Assistant Examiner

U.S. Cl. X.R.

106—22, 26, 27, 32